(12) United States Patent
Yih

(10) Patent No.: US 8,225,914 B2
(45) Date of Patent: Jul. 24, 2012

(54) SHOCK ABSORBING DEVICE FOR A BICYCLE

(75) Inventor: Johnson Yih, Dajia Township, Taichung County (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 1009 days.

(21) Appl. No.: 11/698,641

(22) Filed: Jan. 25, 2007

(65) Prior Publication Data

US 2007/0194509 A1    Aug. 23, 2007

(30) Foreign Application Priority Data

Jan. 27, 2006    (TW) ............................... 95103449 A

(51) Int. Cl.
*F16F 9/36* (2006.01)

(52) U.S. Cl. ............... 188/322.16; 188/322.19; 280/267

(58) Field of Classification Search ............. 188/322.16, 188/322.12, 316, 319, 322.19; 280/277, 280/276; 267/64.15
See application file for complete search history.

(56) References Cited

U.S. PATENT DOCUMENTS

| | | | | |
|---|---|---|---|---|
| 601,978 A * | 4/1898 | Nevill | ............................ | 280/283 |
| 636,726 A * | 11/1899 | Hindmarsh | .................... | 280/283 |
| 2,992,013 A * | 7/1961 | Schultz et al. | ......... | 280/124.127 |
| 3,797,276 A * | 3/1974 | Orain | ............................. | 464/167 |
| 4,254,639 A * | 3/1981 | Teramachi | ...................... | 464/167 |
| 4,705,491 A * | 11/1987 | Andersson | ...................... | 464/167 |
| 5,044,648 A * | 9/1991 | Knapp | .......................... | 280/283 |
| 5,248,159 A | 9/1993 | Moore | | |
| 5,380,026 A * | 1/1995 | Robinson | ...................... | 280/276 |
| 5,634,653 A | 6/1997 | Browning | | |
| 6,155,541 A | 12/2000 | Farris et al. | | |
| 6,421,391 B1 * | 7/2002 | Mellitz | ......................... | 375/257 |

* cited by examiner

*Primary Examiner* — Pamela Rodriguez
(74) *Attorney, Agent, or Firm* — CKC & Partners Co., Ltd.

(57) ABSTRACT

A shock absorbing device may include a first stem having an inner surface extending along a longitudinal axis, and a second stem configured to receive a portion of the first stem. The shock absorbing device may also include a guide member having an outer surface configured to prevent the first stem from rotating relative to the guide member. The shock absorbing device may further include a shock absorbing structure disposed between the first stem and the second stem. The shock absorbing device may further include a bearing device configured to rotatably guide movement of the first stem relative to the second stem along a direction substantially parallel to the longitudinal axis of the first stem and prevent radial sway between the first and second stems.

21 Claims, 8 Drawing Sheets

SHOCK ABSORBING DEVICE FOR A BICYCLE

DESCRIPTION OF THE INVENTION

1. Field of the Invention

This present disclosure relates to a shock absorbing device for a bicycle, and more particularly to a shock absorbing device adapted for a front fork portion or a seat portion of a bicycle.

2. Background of the Invention

FIG. 1 illustrates a conventional shock absorbing device for a bicycle front fork. The shock absorbing device includes a front fork axle 1, a head tube 2 movably surrounding the axle 1 in an upright direction, a shock absorbing structure 3 disposed in the axle 1, and a slide guiding structure 4 disposed between the axle 1 and the head tube 2. The axle 1 includes a retaining portion 101 having a hole 101' at an upper end of the axle 1. The shock absorbing structure 3 includes a plunger 301 and a biasing spring 302 disposed in the axle 1. The plunger 301 is secured within the head tube 2. The plunger 301 extends downwardly into the axle 1 to be connected to an end of the biasing spring 302, which has an opposite end connected to a lower end of the axle 1 such that the plunger 301 is biased away from the lower end of the axle 1. The plunger 301 extends into hole 101' of the retaining portion 101 of the axle 1. The plunger 301 has a noncircular outer contour, which engages a noncircular inner contour of the hole 101' to prevent the head tube 2 from rotating relative to the axle 1. The slide guiding structure 4 is made of plastic or metal material, and has a C-shaped cross-section so as to facilitate sliding movement of the head tube 2 along the axle 1 when the bicycle moves over an uneven or bumpy ground surface, such that the shock generated as a result of running a bicycle wheel can be absorbed by the biasing spring.

However, conventional shock absorbing devices suffer from several drawbacks. For instance, the shape of the slide guiding structure 4 used in such devices creates a relatively large friction resistance, which interferes with the sliding movement of the head tube 2, and undesirably reduces the shock absorbing effect of the biasing spring 302. In addition, conventional shock absorbing devices fail to adequately buffer shock applied to the plunger 301 during sliding movement of the head tube 2. As a result, shock may be unnecessarily transmitted to a rider's hands, thereby resulting in discomfort to the rider.

SUMMARY OF THE INVENTION

An exemplary and nonlimiting object of the present invention is to provide a shock absorbing device for a bicycle that permits smooth axial movement of a stem and minimizes radial sway of the stem to thereby achieve an improved shock absorbing effect.

According to one exemplary embodiment of the invention, the shock absorbing device includes a first tubular stem having a tubular wall that surrounds and extends along an axis, and has a lower end and an overlapping region opposite to each other, and a second stem having a surrounding wall that surrounds and extends along the axis, and has a depressed end and an overlapped region opposite to each other. The surrounding wall is disposed to be telescopically fitted to the tubular wall such that the overlapping region and the overlapped region confront and are movable relative to each other along the axis. A plunger is mounted on the surrounding wall to be movable therewith relative to the tubular wall when a load is applied to depress the depressed end. A shock absorbing structure is disposed to bias the plunger to move away from the lower end against the load. An antifriction bearing structure is disposed between the overlapping and overlapped regions, and includes first and second races disposed on the overlapping and overlapped regions, respectively, and a plurality of rolling elements rollably disposed between the first and second races so as to facilitate smooth movement of the overlapped region relative to the overlapping region along the axis.

In one aspect, the present disclosure is directed to a shock absorbing device. The shock absorbing device may include a first stem having an inner surface extending along a longitudinal axis, and a second stem configured to receive a portion of the first stem. The shock absorbing device may also include a guide member having an outer surface configured to prevent the first stem from rotating relative to the guide member. The shock absorbing device may further include a shock absorbing structure disposed between the first stem and the second stem. The shock absorbing device may further include a bearing device configured to rotatably guide movement of the first stem relative to the second stem along a direction substantially parallel to the longitudinal axis of the first stem and prevent radial sway between the first and second stems.

In another aspect, the shock absorbing device may include a first stem having a tubular wall extending along an axis between a first end and a second end. The first stem may have a hole extending along the axis with an inner noncircular shaped cross-section at the first end of the first stem. The shock absorbing device may also include a second stem having a tubular wall extending along an axis between a first end and a second end. The first end of the first stem may be slideably and coaxially received in the second end of the second stem. The shock absorbing device may further include a plunger disposed within the tubular wall of the second stem. The plunger may have a first end mounted to the second stem, and a second end having an outer noncircular shaped cross-section slideably received in the hole of the first stem and engaging the hole of the first stem to rotate the first stem with the plunger. The shock absorbing device may further include a shock absorbing structure disposed within the tubular wall of the first stem, and a bearing disposed between the first stem and the second stem. The shock absorbing structure may bias the plunger away from the second end of the first stem. The bearing may include a plurality of rolling elements rotatably coupled to the bearing.

In yet another aspect, the shock absorbing device may include a first stem having a tubular wall extending along an axis between a first end and a second end. The first end may have an inner noncircular shaped cross-section, and the second end may be connected to a bicycle frame. The shock absorbing device may also include a second stem having a tubular wall extending along an axis between a first end and a second end. The first end of the second stem may be connected to a bicycle seat. The second end of the second stem may be slideably and coaxially received in the first end of the first stem. The shock absorbing device may further include a plunger having an outer surface configured to prevent the first stem from rotating relative to the plunger. The shock absorbing device may further include a shock absorbing structure disposed between the first stem and the second stem. The shock absorbing structure may bias the plunger away from the second end of the first stem. The shock absorbing device may further include a bearing disposed between the first stem and the second stem.

In yet another aspect, the shock absorbing device may include a first stem extending along an axis between a first end and a second end. The shock absorbing device may also include a second stem having a tubular wall extending along an axis between a first end and a second end. The first end of the first stem may be slideably and coaxially received in the second end of the second stem. The shock absorbing device may further include a shock absorbing structure disposed within the tubular wall of the first stem and between the second end of the first stem and the second end of the second stem so as to bias the second end of the second stem away from the second end of the first stem. The shock absorbing device may further include a bearing disposed between the first stem and the second stem. The bearing may include a plurality of rolling elements rotatably coupled to the bearing.

BRIEF DESCRIPTION OF THE DRAWINGS

Other features and advantages of the present invention will become apparent in the following detailed description of the preferred embodiments of the invention, with reference to the accompanying drawings, in which.

DESCRIPTION OF THE EMBODIMENTS

Figure 1:
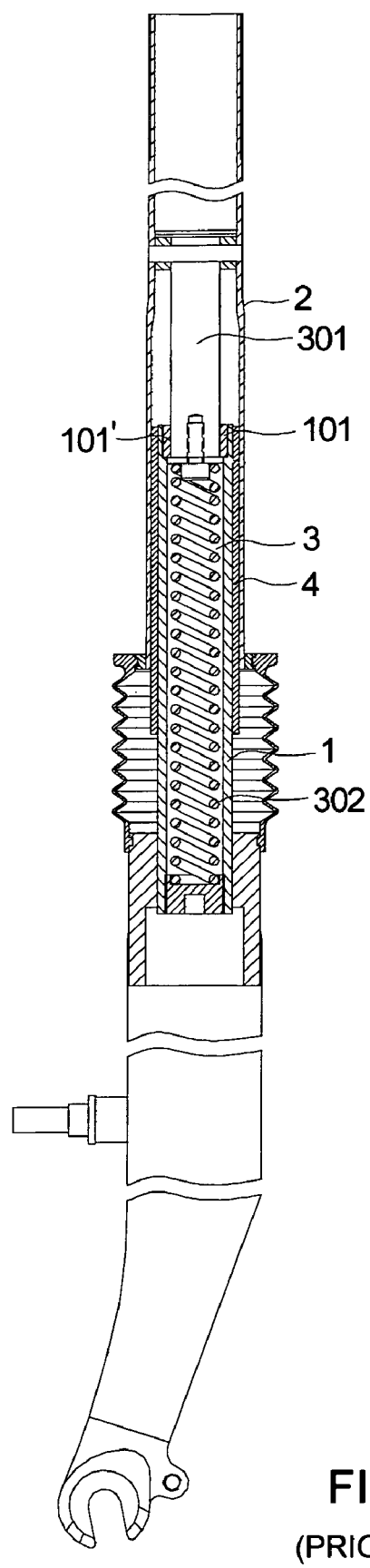
FIG. 1 is a longitudinal sectional view of a conventional shock absorbing device for a bicycle front fork.
Figure 2:
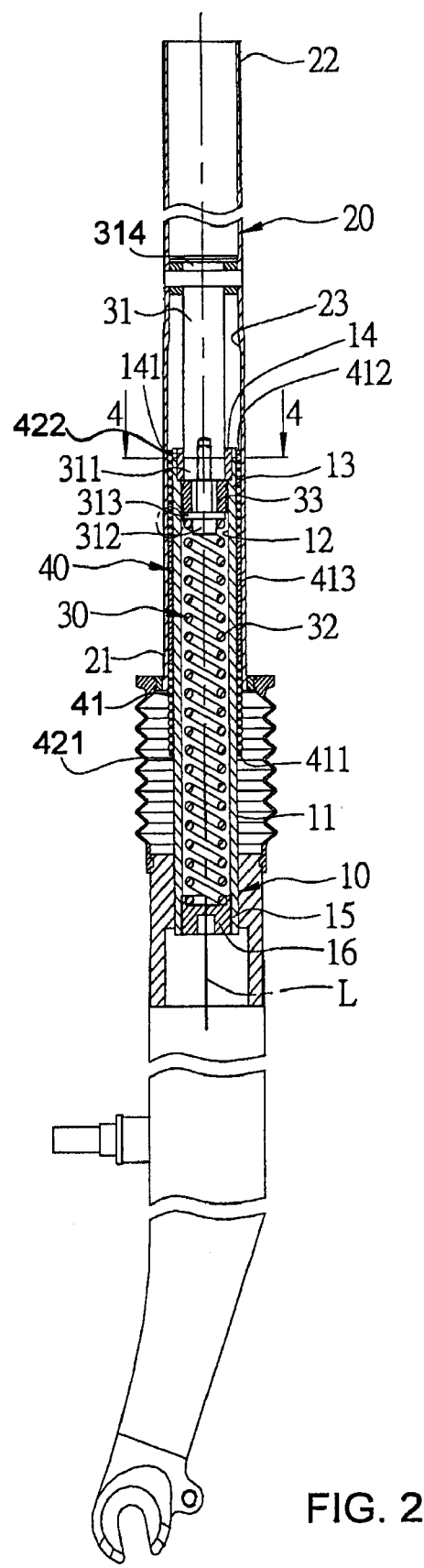
FIG. 2 is a fragmentary longitudinal sectional view of an embodiment of a shock absorbing device according to this disclosure.

Referring to FIG. 2, a first exemplary embodiment of a shock absorbing device according to the present invention may include a first tubular stem 10, a second tubular stem 20, a guide member 31, a shock absorbing structure 32, and an antifriction bearing structure 40. The term "guide member" broadly refers to a member, component, or other structure that can guide movement of one part relative to another. In one exemplary embodiment, the first tubular stem 10 may be connected to a front fork of a bicycle and the second tubular stem 20 may be connected to a head frame of the bicycle.

The first tubular stem 10 is in the form of a bicycle front fork axle in this exemplary embodiment, and has a tubular wall that is movable with a bicycle wheel (not shown), and surrounds and extends along an axis (L) in an upright direction. The tubular wall has a lower end 15 and an overlapping region 13 opposite to the lower end 15 in the upright direction. In this exemplary embodiment, the tubular wall of the first tubular stem 10 has an outer tubular surface 11 that is formed with the overlapping region 13. The first tubular stem 10 further has a retaining structure 14 that is secured to an inner tubular surface 12 of the tubular wall and has a noncircular hole 141 formed therethrough along the axis (L).

The second tubular stem 20 is in the form of a bicycle head tube, and has a surrounding wall that surrounds and extends along the axis (L). The surrounding wall has a depressed end 22 and an overlapped region 21 opposite to the depressed end 22 in the upright direction, and is disposed to be telescopically fitted to the tubular wall of the first tubular stem 10 such that the overlapping region 13 and the overlapped region 21 confront and are movable relative to each other along the axis (L). In this embodiment, the surrounding wall of the second tubular stem 20 has an inner surrounding surface 23 that is formed with the overlapped region 21, such that the overlapped region 21 movably surrounds the overlapping region 13.

In one exemplary embodiment, the guide member 31 may be embodied as a plunger 31. The plunger 31 may be mounted on the inner surrounding surface 23 of the second tubular stem 20 to be movable therewith relative to the tubular wall of the first tubular stem 10 when a load is applied to depress the depressed end 22. The plunger 31 has a secured end 314 that is mounted on the surrounding wall, a head portion 313 that is opposite to the secured end 314, and a shank 311 that is interposed between the secured end 314 and the head portion 313. The head portion 313 may include a tubular pad 33 that is made from any suitable elastomeric material, such as rubber or PU material. The head portion 313 may also include a fastening end 312 that holds the tubular pad 33 against the shank 311. The fastening end 312 may be in any suitable form, such as a screw. The shank 311 is disposed to pass through the hole 141 in the retaining structure 14. The shank 311 may be rotatable with the tubular wall of the first tubular stem 10 about the axis (L). The tubular pad 33 is inserted into the hole 141, such that a relatively high friction exists between the outer surface of the tubular pad 33 and the inner surface of the hole 141, if the tubular pad 33 moves relative to the hole 141. Such a relatively high friction between these surfaces provides a shock absorbing effect when the second tubular stem 20 moves relative to the first tubular stem 10.

Figure 4A:
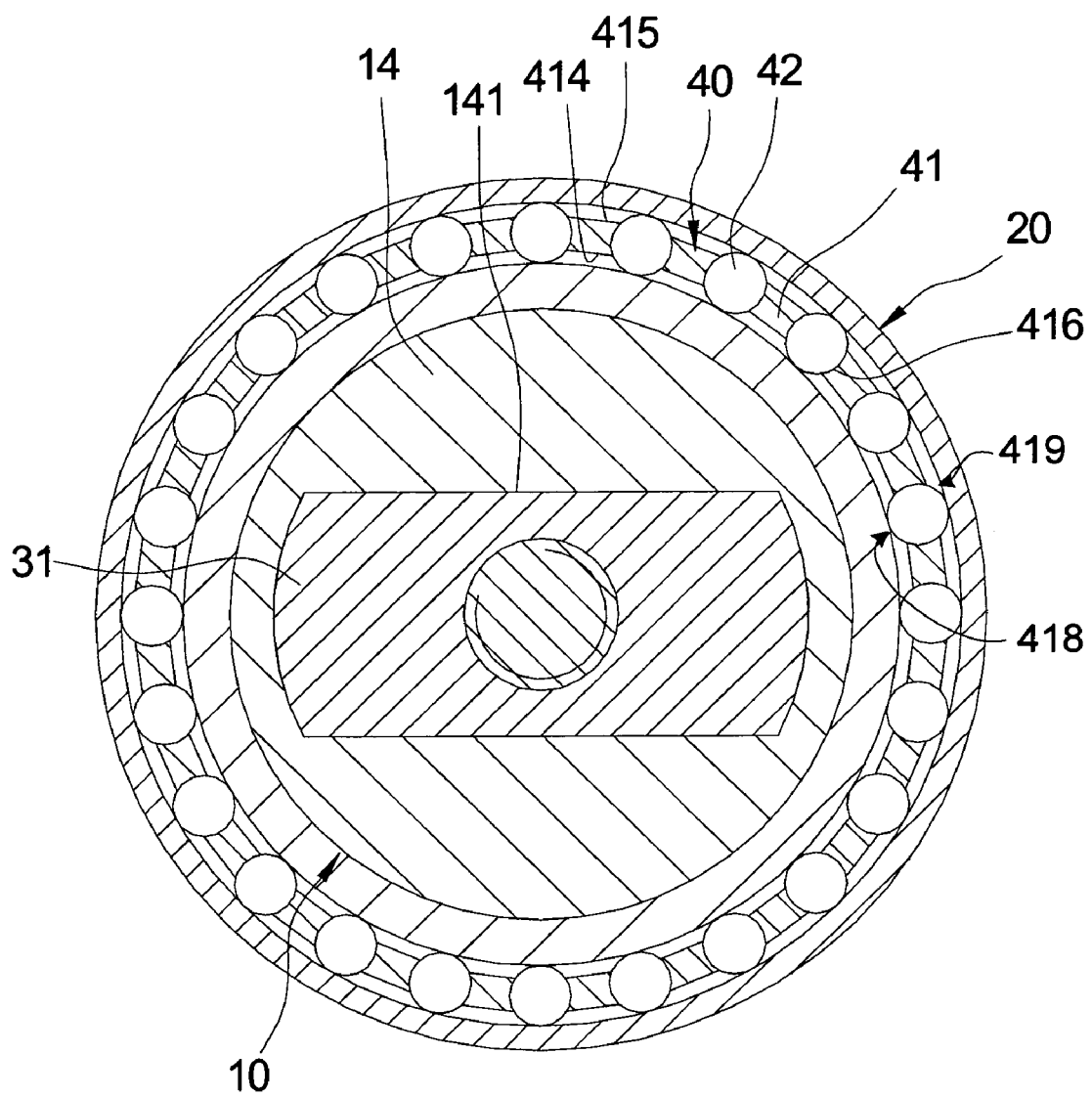
FIG. 4A is a cross-sectional view taken along line 4-4 of FIG. 2 according to one embodiment of this disclosure.

As shown in the exemplary embodiment of FIG. 4A, the outer surface of the plunger 31 may have two flat sides and two curved sides. The inner surface of the noncircular hole 141 may have two inner flat sides and two inner curved sides shaped so as to fit the outer surface of the plunger 31. These shapes may prevent the first tubular stem 10 from rotating and radially moving relative to the plunger 31. Rotating the first tubular stem 10 also may drive the second tubular stem 20 to rotate together with the first tubular stem 10.

Figure 4B:
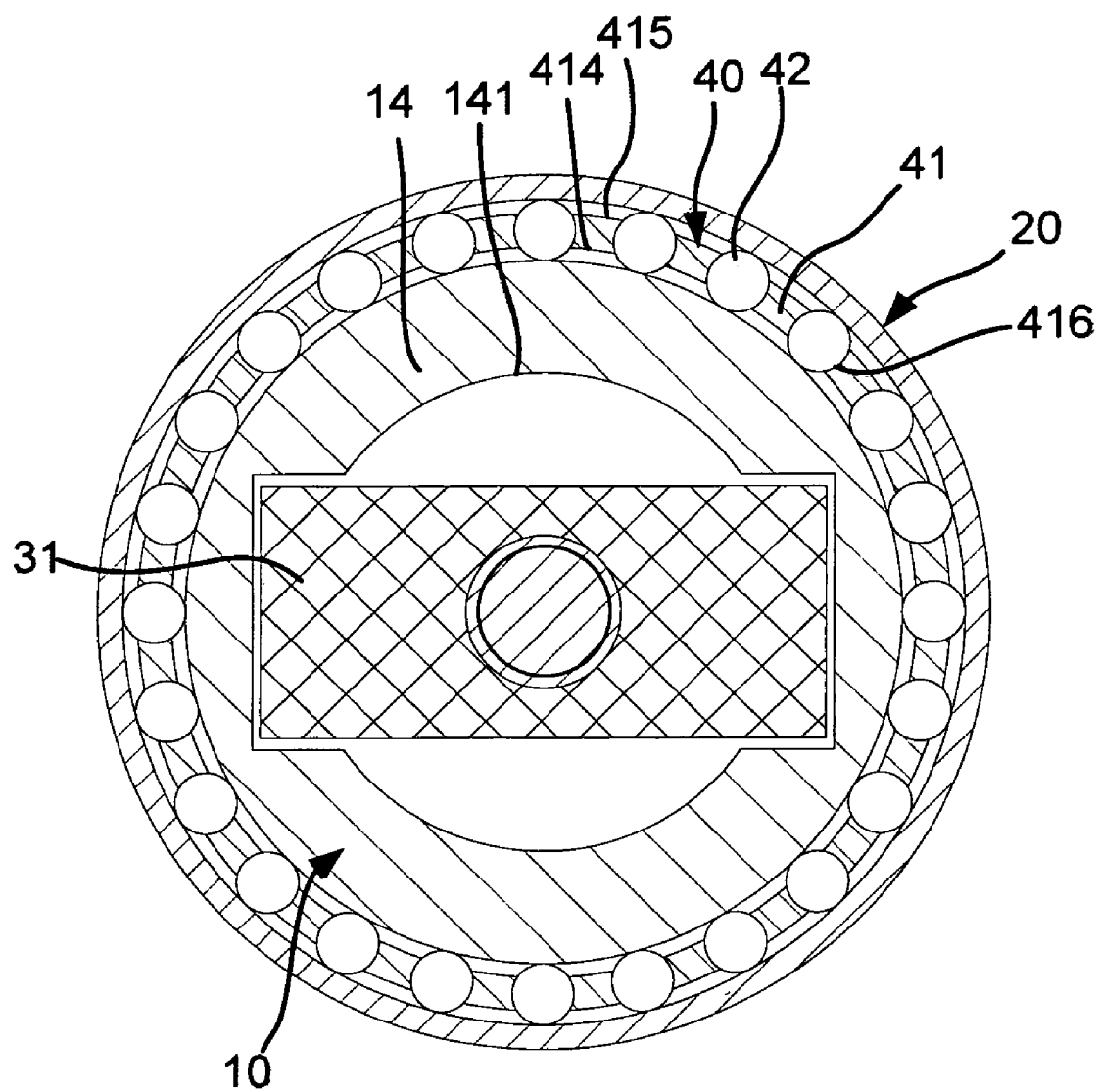
FIG. 4B is a cross-sectional view taken along line 4-4 of FIG. 2 according to another embodiment of this disclosure.

As also shown in the exemplary embodiment of FIG. 4B, the outer surface of plunger 31 may have four flat sides. The hole 141 may have a circular shape with two square cutout sides and two opposite lateral sides so as to fit the outer surface of the plunger 31. The hole 141 also may have two curved surfaces at opposite upper and lower sides. These shapes may be relatively easy to manufacture and may save in manufacturing costs.

As further shown in the exemplary embodiment of FIG. 2, the shock absorbing structure 32 may be in any suitable form. For instance, the shock absorbing structure 32 may be embodied as a biasing spring that is disposed within the tubular wall of the first tubular stem 10. The shock absorbing structure 32 may have upper and lower biasing ends, which engage the head portion 313 of the plunger 31, and an end cap 16, which may be secured on the lower end 15 of the first tubular stem 10, respectively, so as to bias the plunger 31 away from the lower end 15 with a biasing force against the load applied to the depressed end 22.

Figure 3:
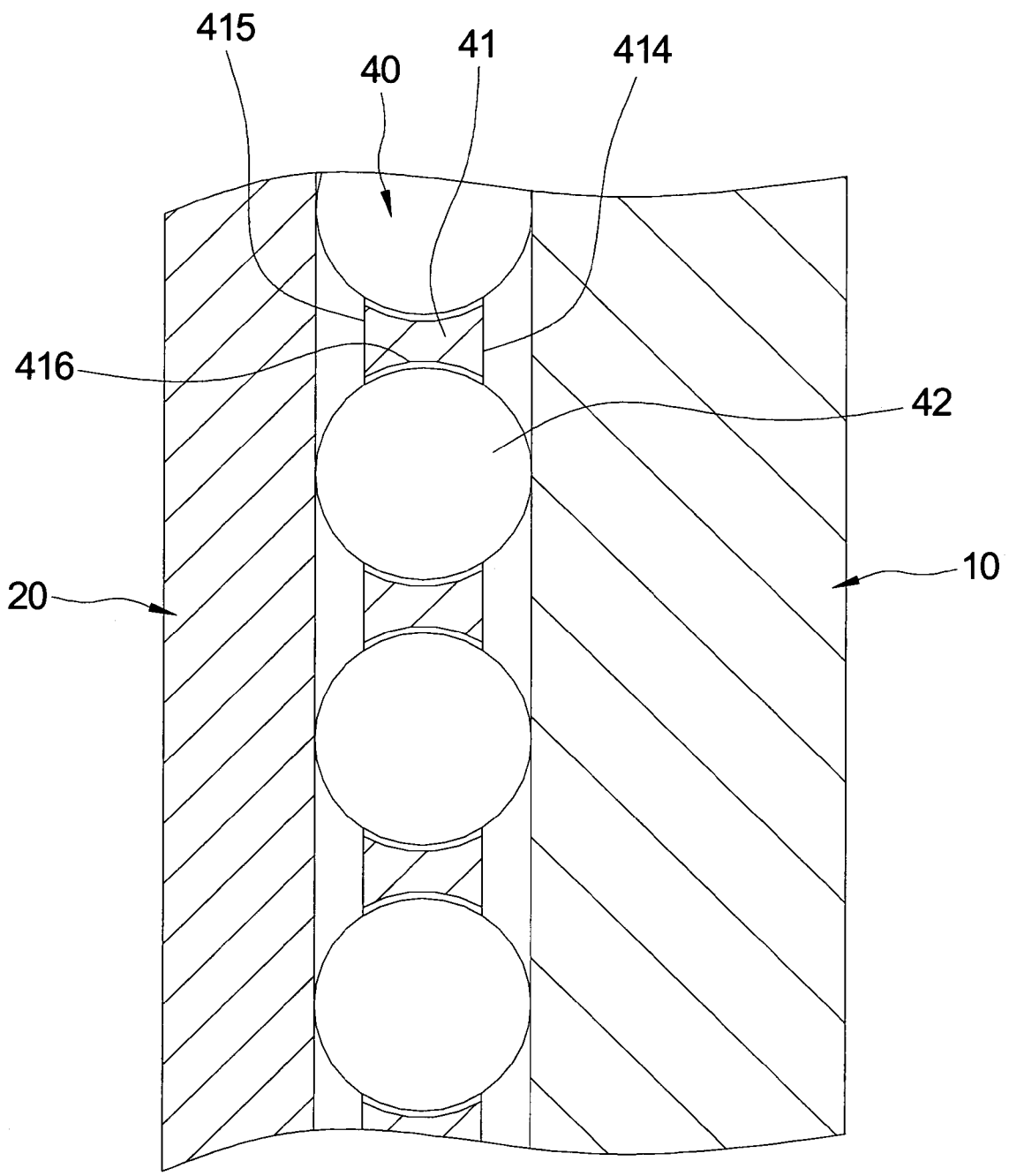
FIG. 3 is an enlarged view of an encircled portion in FIG. 2.

In some exemplary embodiments shown in FIGS. 3, 4A, and 4B, the antifriction bearing structure 40 may be disposed between the overlapping and overlapped regions 13, 21. The antifriction bearing structure 40 may be embodied as an antifriction ball bearing. The antifriction bearing structure 40 may include first and second races 418 and 419, which are disposed on the overlapping and overlapped regions 13, 21, respectively. The antifriction bearing structure 40 may also include a plurality of rolling elements 42 that are rollably disposed between the first and second races 418 and 419 so as to facilitate smooth movement of the overlapped region 21 relative to the overlapping region 13 along the axis (L).

The antifriction bearing structure 40 also may include a plastic cage 41 that surrounds the axis (L) and is disposed on the overlapping region 13. The cage 41 may have first and second major surfaces 414, 415 that confront and are spaced apart from the overlapping and overlapped regions 13, 21, respectively, and a plurality of retaining cells 416 that extend from the first major surface 414 to the second major surface 415, such that the rolling elements 42 are rollably received in the retaining cells 416, respectively. The rolling elements 42 may be made from any suitable material, for example, a relatively rigid metal material.

In the exemplary embodiment of FIG. 2, the cage 41 also may include upper and lower segments 412, 411, which are disposed distal from and proximate to the upper and lower ends 422 and 421, respectively. The cage 41 further may include an intermediate segment 413 that is interposed between the upper and lower segments 412, 411. In one exemplary embodiment, only the upper and lower segments 412, 411 have the retaining cells 416 for receiving the rolling elements 42. In other words, the intermediate segment 413 may not include retaining cells 416 to lower the cost of making the antifriction bearing structure 40. In other embodiments, the retaining cells 416 may be disposed on one or more of the upper, intermediate, or lower segments 412, 413, 411.

Figure 5:
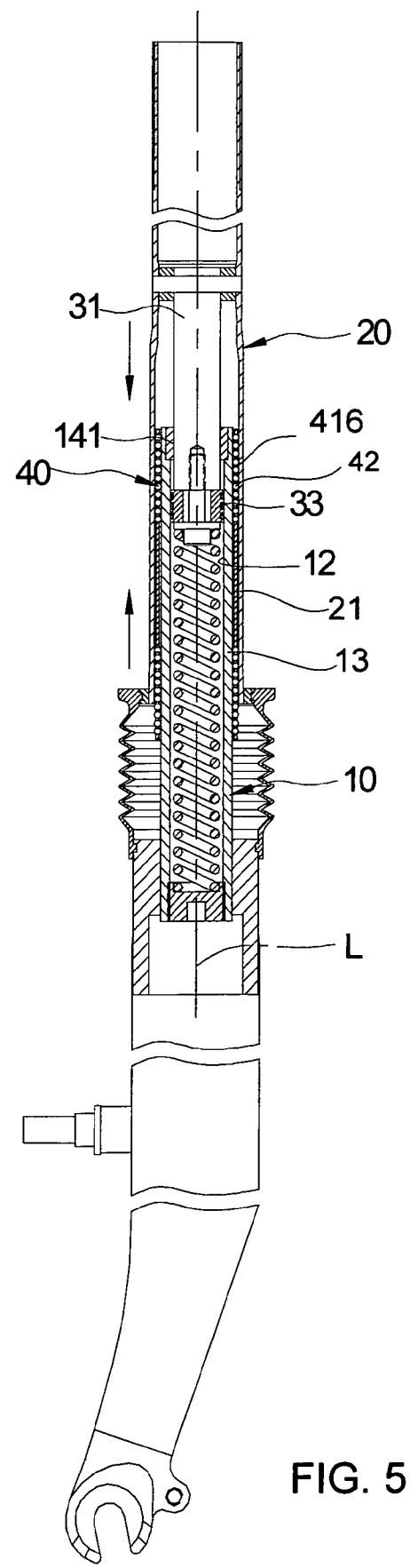
FIG. 5 is a fragmentary longitudinal sectional view of the shock absorbing device shown in FIG. 2, showing a head tube moved downwardly relative to a front fork axle.

As shown in the exemplary embodiment of FIG. 5, when the bicycle (not shown) with the shock absorbing device of this invention moves over an uneven or bumpy ground surface, the overlapped region 21 moves smoothly along the axis (L) relative to the overlapping region 13 by means of the rolling of the rolling elements 42 on the overlapping and overlapped regions 13, 21. The antifriction bearing structure 40 may perform two functions. First, it may guide the overlapped region 21 to move relative to the overlapping region 13 on the first tubular stem 10 along a direction that is substantially parallel to a central, longitudinal axis of the first and second tubular stems 10 and 20. And second, it may prevent the overlapped region 21 and the overlapping region 13 from moving relative to each other along a direction substantially perpendicular to the central, longitudinal axis of the first and second tubular stems 10 and 20. Since the rolling elements 42 are rollably mounted in the retaining cells 416, radial sway of the overlapped region 21 relative to the overlapping region 13 during the sliding movement of the overlapped region 21 can be minimized.

As also shown in the exemplary embodiment of FIG. 5, the tubular pad 33 may act as a buffer between the upper biasing end of the shock absorbing structure 32 and the shank 311 of the plunger 31 for enhanced comfort when the shock absorbing device moves over an uneven or bumpy ground surface.

Figure 6:
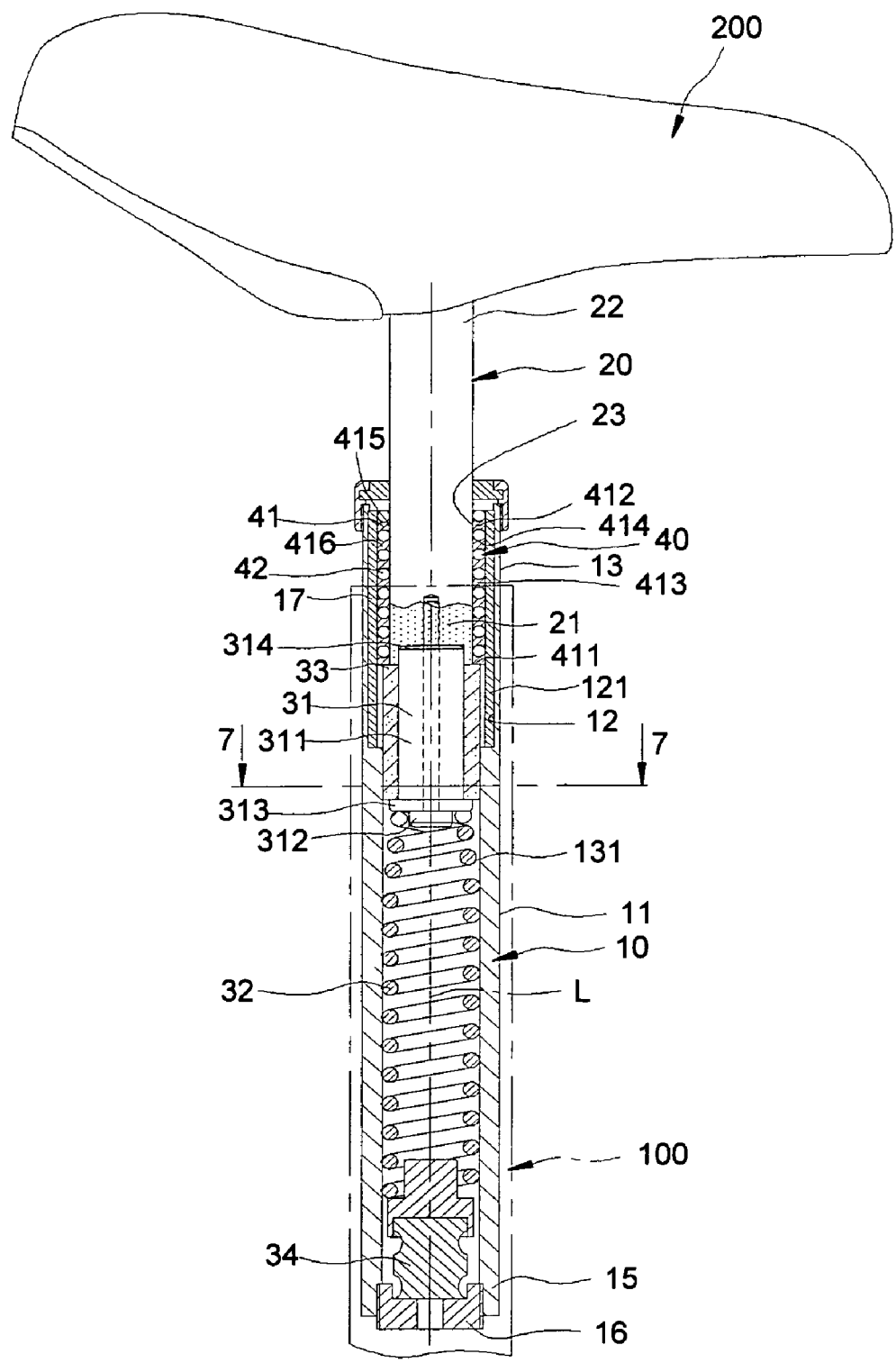
FIG. 6 is a fragmentary longitudinal sectional view of another embodiment of a shock absorbing device according to this disclosure.
Figure 7:
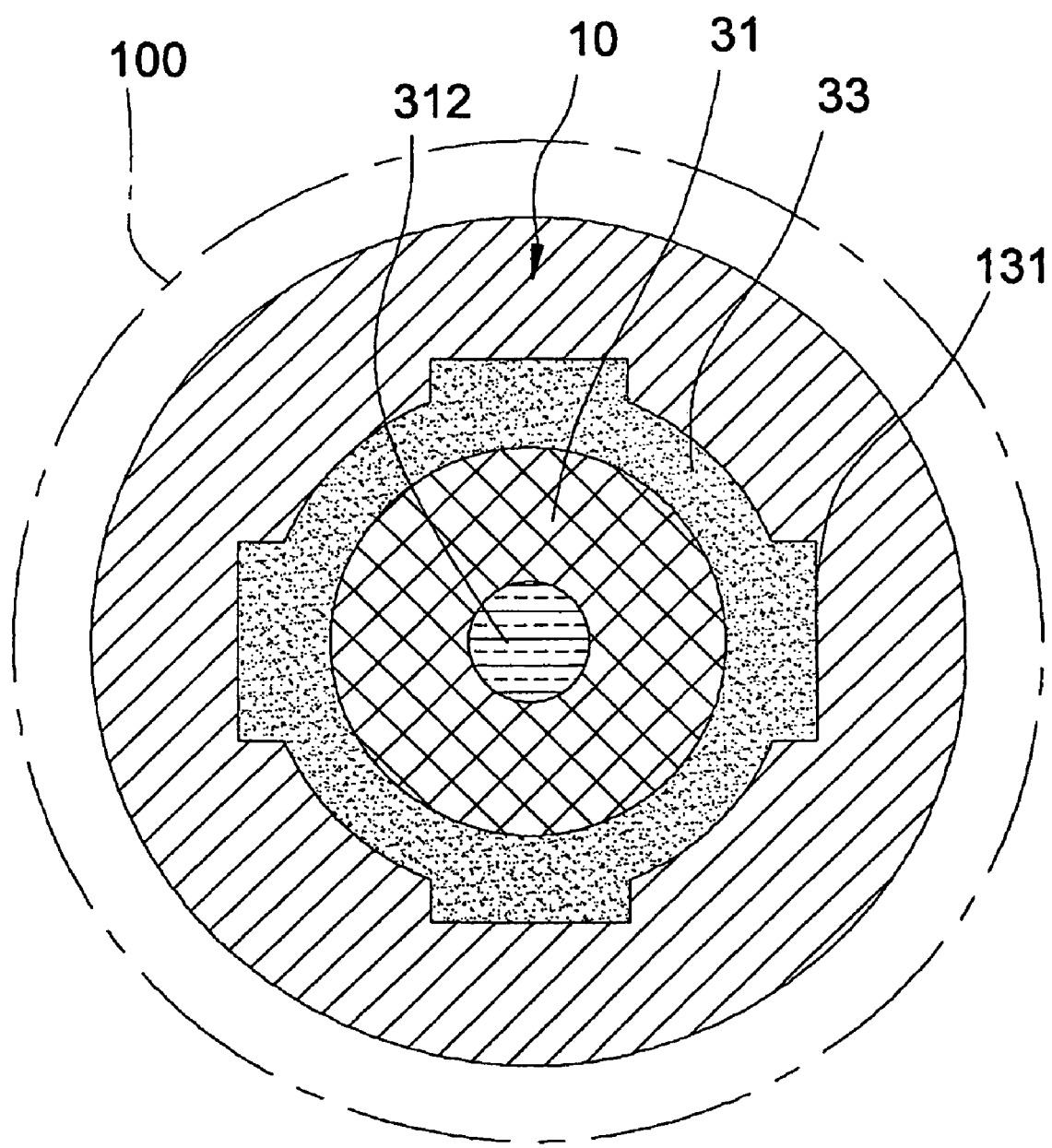
FIG. 7 is a cross-sectional view taken along line 7-7 of FIG. 6.

FIGS. 6 and 7 illustrate a second exemplary embodiment of a shock absorbing device according to another aspect of the invention. This second exemplary embodiment is similar to the first exemplary embodiment. In the second exemplary embodiment, however, the device is in the form of a bicycle seat post to be connected to a bicycle seat tube 100 with a depressed end 22 that engages a bicycle seat 200. That is, the overlapped region 21 of the second tubular stem 20, which is formed on an outer surrounding surface of the second tubular stem 20, is disposed to be movably inserted into the overlapping region 13 of the first tubular stem 10 along the axis (L).

In the exemplary embodiment of FIGS. 6 and 7, the first tubular stem 10 may include a first inner section 121 with a circular shaped cross-section to receive a liner tube 17, which receives the antifriction bearing structure 40. The first tubular stem 10 may further include a second inner section 131 with a noncircular shaped cross-section to receive the plunger 31.

As also shown in the exemplary embodiment of FIGS. 6 and 7, the shock absorbing device also may include a guide member 33. The guide member 33 may be embodied as an annular tubular pad disposed around the plunger 31. The tubular pad 33 may be inserted into the noncircular inner section 131 of the first tubular stem 10. The tubular pad 33 and the noncircular inner section 131 of the first tubular stem 10 may be shaped in any suitable fashion to fit each other.

As further shown in the exemplary embodiment of FIGS. 6 and 7, the plunger 31 has a secured end 314 that is mounted on the surrounding wall, a head portion 313 that is opposite to the secured end 314, and a shank 311 that is interposed between the secured end 314 and the head portion 313. The head portion 313 may include a fastening end 312 that holds the tubular pad 33 against the shank 311. The fastening end 312 may be in any suitable form, such as a screw.

In the exemplary embodiment of FIG. 7, the shape of the inner surface of the tubular pad 33 may be circular. Similarly, the shape of the outer surface of the plunger 31 also may be circular. The outer surface of the tubular pad 33 may have four square tabs. The noncircular inner section 131 of the first tubular stem 10 may have four inner square cutouts shaped so as to fit over the outer surface of tubular pad 33 and prevent the first tubular stem 10 from rotating relative to the tubular pad 33. The tubular pad 33 may be made of any suitable materials, such as rubber. The shape of the inner surface of the tubular pad 33 may be any suitable shape as long as it resists or prevents relative rotational movement of the plunger 31 relative to the tubular pad 33. In the illustrated embodiment, the dimensions of the inner surface of the tubular pad 33 are selected so as to create a tight grip around the plunger 31 when the plunger 31 is inserted within the tubular pad 33. Such a tight grip may create relative high friction between the outer surface of the plunger 31 and the inner surface of the tubular pad 33, and impede the relative rotation between the plunger 31 and the tubular pad 33. Relatively high friction also may exist between the outer surface of the tubular pad 33 and the inner surface of the first tubular stem 10 to provide a shock absorbing effect when the second tubular stem 20 moves relative to the first tubular stem 10.

While the present invention has been described in connection with what is considered the most practical and preferred embodiments, it is understood that this invention is not limited to the disclosed embodiments, but is intended to cover various arrangements included within the spirit and scope of the broadest interpretations and equivalent arrangements.

What is claimed is:

1. A shock absorbing device comprising:
    a first stem having a tubular wall extending between a first end and a second end, and defining a longitudinal axis;
    a second stem having a tubular wall extending between a first end and a second end, and configured to receive a portion of the first stem;
    a guide member having an outer surface configured to prevent the first stem from rotating relative to the guide member;
    a shock absorbing structure disposed between the first stem and the second stem;
    a bearing device including a tubular bearing cage disposed between the first stem and the second stem, and at least one ball bearing rotatably received in the tubular bearing cage, wherein the bearing device is configured to rotatably guide movement of the first stem relative to the second stem along a direction substantially parallel to the longitudinal axis of the first stem and prevent radial sway between the first and second stems; and a generally tubular pad provided in frictional engagement between an inner surface of the first stem and the outer surface of the guide member.

2. The shock absorbing device of claim 1, wherein the first stem is connected to a front fork of a bicycle and the second stem is connected to a head frame of the bicycle.

3. The shock absorbing device of claim 1, wherein the guide member comprises a plunger and the outer surface of the guide member has a noncircular shape configured to fit within the inner surface of the first stem.

4. The shock absorbing device of claim 1, wherein the first stem is connected to a bicycle seat and the second stem is connected to a bicycle frame.

5. The shock absorbing device of claim 1, wherein the shock absorbing structure is disposed between the second end of the first stem and the second end of the second stem so as to bias the second end of the second stem away from the second end of the first stem.

6. The shock absorbing device of claim 1, wherein the inner surface of the first stem has a first noncircular shape, and the outer surface of the guide member has a second noncircular shape arranged to fit within the first noncircular shape of the inner surface of the first stem.

7. The shock absorbing device of claim 1, wherein the tubular bearing cage includes a first surface and a second surface and a plurality of cells extending from the first surface through the second surface to receive the ball bearing.

8. The shock absorbing device of claim 1, wherein the bearing device includes at least one cell including a through-hole having a spherical inner surface to receive the ball bearing.

9. The shock absorbing device of claim 8, wherein the tubular cage of the bearing device includes upper, intermediate, and lower segments, and the at least one ball bearing is arranged only within the upper and lower segments.

10. The shock absorbing device of claim 1, wherein the shock absorbing structure includes a first shock absorber and a second shock absorber.

11. The shock absorbing device of claim 1, wherein an amount of friction between the generally tubular pad, the inner surface of the first stem, and the outer surface of the guide member is sufficient to provide shock absorption when the second stem moves relative to the first stem.

12. A shock absorbing device for a bicycle comprising:
a first stem having a tubular wall extending along an axis between a first end and a second end, the first stem having a hole extending along the axis with an inner noncircular shaped cross-section at the first end of the first stem;

a second stem having a tubular wall extending along an axis between a first end and a second end, wherein the first end of the first stem is slideably and coaxially received in the second end of the second stem;

a plunger having an outer surface configured to prevent the first stem from rotating relative to the plunger;

a shock absorbing structure disposed between the first stem and the second stem;

an antifriction bearing including a tubular bearing cage disposed between the first stem and the second stem, and surrounding the first stem, wherein the tubular bearing cage includes a plurality of retaining cells, and a plurality of ball bearings rotatably received in the plurality of retaining cells; and a generally tubular pad provided in frictional engagement between an inner surface of the first stem and the outer surface of the plunger.

13. The shock absorbing device of claim 12, wherein the second end of the first stem is connected to a front fork of the bicycle, and the first end of the second stem is connected to a head frame of the bicycle.

14. The shock absorbing device of claim 12, wherein the shock absorbing structure includes a first shock absorber and a second shock absorber.

15. The shock absorbing device of claim 12, wherein each of the retaining cells including a through-hole having a spherical side wall to rotatably retain the ball bearings.

16. The shock absorbing device of claim 12, wherein the plunger is disposed within the tubular wall of the second stem and has a first end mounted to the second stem, and a second end has an outer noncircular shaped cross-section slideably received in the hole of the first stem and engages the hole of the first stem to rotate the first stem with the plunger.

17. The shock absorbing device of claim 16, wherein the noncircular shaped cross-section of the hole is substantially rectangular, and the noncircular shaped cross-section of the plunger is substantially rectangular.

18. The shock absorbing device of claim 12, wherein the tubular pad is configured to receive the plunger and fitted within a retaining structure disposed within the first stem.

19. The shock absorbing device of claim 12, wherein the first end of the second stem is connected to a bicycle frame, and the second end of the first stem is connected to a bicycle seat.

20. The shock absorbing device of claim 12, wherein the noncircular shaped cross-section of the hole has a circular shape with square cutouts and the noncircular shaped cross-section of the plunger is substantially rectangular to fit within the inner surface of the hole.

21. The shock absorbing device of claim 12, wherein an amount of friction between the generally tubular pad, the inner surface of the first stem, and the outer surface of the plunger is sufficient to provide shock absorption when the second stem moves relative to the first stem.

* * * * *